United States Patent [19]

Kasai et al.

[11] Patent Number: 4,952,651
[45] Date of Patent: Aug. 28, 1990

[54] HIGHLY CROSSLINKED POLYMER PARTICLES AND PROCESS FOR PRODUCING THE SAME

[75] Inventors: Kiyoshi Kasai, Kameyama; Masayuki Hattori, Aichi; Hiroshi Tadenuma; Shiro Yasukawa, both of Yokkaichi, all of Japan

[73] Assignee: Japan Synthetic Rubber Co., Ltd., Tokyo, Japan

[21] Appl. No.: 226,200

[22] Filed: Jul. 29, 1988

[30] Foreign Application Priority Data

Mar. 30, 1988 [JP] Japan ................... 63-77689

[51] Int. Cl.$^5$ ........................... C08F 236/02
[52] U.S. Cl. ...................... 526/201; 521/62; 521/63; 521/64; 526/203
[58] Field of Search ............ 526/201, 203; 521/64, 521/62, 63

[56] References Cited

U.S. PATENT DOCUMENTS

| 4,186,120 | 1/1980 | Ugelstad | 260/29.6 |
| 4,336,173 | 6/1982 | Ugelstad | 524/836 |
| 4,419,245 | 12/1983 | Barrett et al. | 526/201 |
| 4,694,035 | 9/1987 | Kasai et al. | 524/458 |

FOREIGN PATENT DOCUMENTS

| 54-097582 | 8/1979 | Japan . |
| 61-241310 | 10/1986 | Japan . |
| 63-072713 | 4/1988 | Japan . |
| 63-072715 | 4/1988 | Japan . |

Primary Examiner—Veronica P. Hoke
Attorney, Agent, or Firm—Oblon, Spivak, McClelland, Maier & Neustadt

[57] ABSTRACT

Highly crosslinked polymer particles, which may be porous, consisting essentially of a non-hydrophilic polymer can be produced by adding a polymerizable monomer mixture comprising at least 20% by weight of at least one non-hydrophilic, crosslinking polyvinyl monomer to an aqueous dispersion containing a non-crosslinked, low molecular weight polymer particles having a weight average molecular weight of 500–10,000 as a dispersoid, with a non-reactive solvent in a proportion of not more than 1 part by weight per part by weight of the polymerizable monomer mixture, the proportion of the polymerizable monomer mixture plus the non-reactive solvent to the non-crosslinked, low molecular weight polymer particles being 4 to 20 parts by weight per part by weight of the non-crosslinked, low molecular weight polymer particles, and then subjecting the polymerizable monomer mixture to radical emulsion polymerization with stirring.

19 Claims, No Drawings

HIGHLY CROSSLINKED POLYMER PARTICLES AND PROCESS FOR PRODUCING THE SAME

This invention relates to highly crosslinked polymer particles having very small particle diameters, a narrow particle diameter distribution an high thermal resistance, and a proces for producing the same.

Heretofore, highly corsslinked, very small polymer particles having thermal resistance for use as an organic filler in engineering plastics and polyamides have been desired in order to improve the gloss and surface sliding property of films of the resins; however, polymer particles available now are not satisfactory in hardness, thermal resistance, particle diameter and particle diameter distribution.

Crosslinked polymer particles have heretofore been produced by the following methods:

(1) A monomer mixture comprising a large amount of a crosslinking monomer such as polyfunctional vinyl monomer or the like is suspension-polymerized. This is conventionally effected, and the polymer particles obtained by this method have a very broad particle diameter distribution ranging from several hundreds of microns to several microns. However, it is very difficult to produce smaller polymer particles by suspension polymerization. In order to produce polymer particles having particle diameters of not more than 1 $\mu$m by suspension polymerization, it is known that the monomers must be polymerized while suspending them in the form of very small particles by means of a homogenizer. By this method, particles having particle diameters of not more than 1 $\mu$m can be obtained, but the particle diameter distribution of the particles is very broad.

(2) On the other hand, emulsion polymerization enables the production of polymer particles having particle diameters of not more than 1 $\mu$m and a relatively narrow particle diameter distribution. However, it is very difficult to produce highly crosslinked polymer particles by the emulsion polymerization.

Therefore, it has heretofore been impossible to produce highly crosslinked polymer particles having particle diameters of about 1 $\mu$m or less and a narrow particle diameter distribution.

In order to solve the above problems, the following attempts have been made:

(i) Polymer particles obtained by suspension polymerization are subjected to classification. However, according to the current classification techniques, it is impossible to obtain particles having particle diameters of not more than 1 $\mu$m and such a particle diameter distribution that at least 80% of the particles have particle diameters falling within the range of an average particle diameter ±10%.

(ii) Various seed polymerization methods are known to produce crosslinked polymer particles having small particle diameters. A representative thereof is disclosed in Japanese Patent Application Kokai No. 225,208/86, in which crosslinking monomers are added to slightly crosslinked seed polymer particles and then polymerized. In this method, the seed polymer particles are crosslinked, though slightly, and therefore, they have only a low monomer-absorbing capacity, and hence, polymerization procedure must be repeated for making the particle diameters uniform. In addition, since the proportion of the slightly crosslinked seed polymer particles to the whole of the particles is great, the hardness and thermal resistance of the particles produced cannot be made higher than certain level.

Japanese Patent Application Kokai No. 241,310/86 teaches a polymerization method in which when the polymerization conversion of an emulsion polymerization reaches 1–40%, crosslinking monomers are added and the polymerization is continued. However, in this method, the proportion of crosslinking monomers to the whole of the particles is small as in Japanese Patent Application Kokai No. 225,208/86, and hence, the resulting particles have insufficient hardness and thermal resistance.

Japanese Patent Application Kokai No. 72,715/88 also discloses the production of porous, crosslinked polymer particles having uniform particle diameters by seed polymerization. However, the polymer particles produced have particle diameters of 2–30 $\mu$m and hence are not satisfactory as the above-mentioned organic filler.

Japanese Patent Application Kokai Nos. 72,713/88 and 72,715/88 disclose the production of solvent-resistant, crosslinked, fine polymer particles having unfirom particle diameters by polymerizing a monomer mixture of non-crosslinking monomers and crosslinking monomers absorbed by non-crosslinked polymer particles. However, the diameters of the particles are still as large as 1 to 30 $\mu$m and it is necessary to allow the seed polymer particles to absorb the monomers in several steps and the water-solubility of the monomer to be used in the first step is limited.

U.S. Pat. No. 4,336,173; 4,186,120 and 4,694,035 disclose a technique of increasing the monomer-absorbing capacity of seed polymer. However, the methods disclosed in the U.S. patents aim at increasing the monomer/seed polymer weight ratio for the purpose of producing polymer particles having large particle diameters, and hence, the ratio is too large, for example, 20–500. Therefore, the control of particle diameter becomes difficult during the polymerization and a part of the monomers remain unabsorbed by the seed polymer particles. Therefore, when this method is applied to an emulsion-polymerization system in which crosslinking monomers are present in a major proportion in the polymerizable monomer mixture, unabsorbed monomers are emulsion-polymerized and the resulting polymer deteriorates the stability of polymerization system.

In conventional polymerization in which the proportion of the crosslinking monomers is less than 10% by weight, polymer particles formed by polymerization can further absorb monomers, so that even when the monomers remain unabsorbed by seed polymer particles they are absorbed and disappear with progress of polymerization. Thus, the above polymerization proceeds without causing the problems by the technique of the above-mentioned U.S. patents.

The present inventors have conducted extensive research for solving the above-mentioned problems to obtain highly crosslinked, very fine polymer particles having a narrow particle diameter distribution.

An object of this invention is to provide highly crosslinked, non-porous or porous, polymer particles having an average particle diameter of 0.1–1 $\mu$m and a narrow particle diameter distribution.

Another object of this invention is to provide highly crosslinked, non-porous or porous, thermally resistant polymer particles consisting essentially of a non-hydrophilic polymer of a polymerizable monomer mixture comprising at least 20% by weight of at least one non-hydrophilic, crosslinking polyvinyl monomer and having an average particle diameter of 0.1–1 μm and a narrow particle diameter distribution.

A further object of this invention is to provide a process for producing the above highly crosslinked polymer particles.

Other objects and advantages of this invention will become apparent from the following description.

According to this invention, there are provided highly crosslinked, non-porous or porous, polymer particles consisting essentially of a non-hydrophilic polymer of a polymerizable monomer mixture comprising at least 20% by weight of at least one non-hydrophilic, crosslinking polyvinyl monomer and satisfying the following conditions (a) to (e):

(a) the average particle diameter ($r_m$) is 0.1–1.0 μm and the proportion of particles having particle diameters falling the range of $0.9r_m$ –1.1 $r_m$ to the whole of particles is 80% by weight or more, (b) the polymer particles are substantially insoluble in toluene and substantially non-swellable with toluene, (c) when the polymer particles are heated on a thermobalance in a nitrogen atmosphere while elevating the temperature at a rate of 10° C./min, the temperature at which the weight of the particles reduces by 10% is at least 380° C., (d) when the polymer particles are heated at 300° C. for 5 hours in a nitrogen atmosphere, the weight reduction is at most 30%, and (e) the polymer particles are not melt-adhered to One another at 200° C. in a nitrogen atmosphere.

This invention further provides a process for producing the above highly crosslinked polymer particles which comprises adding a polymerizable monomer mixture comprising at least 20% by weight of at least one non-hydrophilic, crosslinking polyvinyl monomer to an aqueous dispersion containing a non-crosslinked low molecular weight polymer particles having a weight average molecular weight of 500–10,000 as a dispersoid, with a non-reactive solvent in a proportion of not more than 1 part by weight per part by weight of the polymerizable monomer mixture, the proportion of the polymerizable monomer mixture plus the non-reactive solvent to the non-crosslinked low molecular weight polymer particles being 4 to 20 parts by weight per part by weight of the non-crosslinked, low molecular weight polymer particles, and then subjecting the polymerizable monomer mixture to radical emulsion polymerization with stirring.

The above conditions (a) to (e) for the crosslinked polymer particles are required for the polymer particles to be used as an organic filler in engineering plastics or polyamides for improving the gloss and surface sliding property of films of the resins.

In the process of this invention, non-crosslinked low molecular weight polymer particles having a specific average molecular weight are used as the so-called seed polymer particles. The seed polymer particles are required to have a weight average molecular weight of 500–10,000, preferably 700–7,000, more preferably 1,000–6,000.

The term "weight average molecular weight" used herein for polymer particles means a weight average molecular weight which can be conventionally determined by measuring the viscosity of a solution of the polymer particles or by a gel permeation chromatography.

When the weight average molecular weight of the seed polymer particles exceeds 10,000, the capacity of the seed polymer particles absorbing the polymerizable monomer mixture and the non-reactive solvent becomes too small and a too large amount of the monomer mixture remain unabsorbed and come to polymerize independently, resulting in the formation of a large amount of polymer particles having particle diameters outside the desired range. In particular, these undesirable polymer particles are fine and colloidally instable and hence deteriorate the stability of the polymerization system, whereby a large amount of coagulation products are consequently formed during the polymerization.

Also, when the weight average molecular weight of the seed polymer particles is less than 500, the capacity of the seed polymer particles absorbing the polymerizable monomer mixture and the non-reactive solvent becomes small as in the case of more than 10,000 and the same problems as mentioned above are caused.

Since the particle diameter and particle diameter distribution of the seed polymer particles affect those of the crosslinked polymer particles obtained, it is preferable to use seed polymer particles having particle diameters as uniform as possible, namely as controlled a narrow particle diameter distribution as possible. Specifically and preferably, the particle diameters of the seed polymer particles are 0.05 to 0.6 μm and the particle diameter distribution is so narrow that the fluctuation factor is not more than 10%.

The composition of the seed polymer is not critical as far as the polymer is soluble in or swellable with the polymerizable monomer mixture used for the polymerization, and it is preferable to use a polymer of the same type monomer as the monomers to be polymerized. Specifically, polymers of styrene, acrylic acid esters such as methyl acrylate or butyl acrylate, and butadiene alone or in combination of two or more are preferred.

The method of preparing such seed polymer particles is not critical and they can be prepared by an emulsion polymerization or soap-free polymerization method in which a relatively large amount of a mercaptan type molecular weight modifier is used. In the preparation of the seed polymer particles, a seed polymerization method may also be used for controlling the particle diameters of the seed polymer particles.

The non-hydrophilic, crosslinking polyvinyl monomers used in this invention are compounds having at least two, preferably two copolymerizable double bonds and include, for example, non-conjugated divinyl compounds such as divinylbenzene and the like and polyacrylate compounds such as diacrylate compounds, triacrylate compounds, tetraacrylate compounds, dimethacrylate compounds, trimethacrylate compounds and the like.

Examples of the polyacrylate compounds are as follows:

Diacrylate compound

Polyethylene glycol diacrylate, 1,3-butylene glycol diacrylate, 1,6-hexene glycol diacrylate, neopentyl glycol diacrylate, polypropylene glycol diacrylate, 2,2'-bis(4-acryloyloxypropoxyphenyl)propane and 2,2'-bis(4-acryloyloxydiethoxyphenyl)propane.

Triacrylate compound

Trimethylolpropane triacrylate, trimethylolethane triacrylate and tetramethylolmethane triacrylate.

Tetraacrylate compound

Tetramethylolmethane tetraacrylate.

Dimethacrylate compound

Ethylene glycol dimethacrylate, diethylene glycol dimethacrylate, triethylene glycol dimethacrylate, polyethylene glycol dimethacrylate, 1,3-butylene glycol dimethacrylate, 1,4-butylene glycol dimethacrylate, 1,6-hexene glycol dimethacrylate, neopentyl glycol dimethacrylate, dipropylene glycol dimethacrylate and 2,2'-bis(4-methacrylolyloxydiethoxyphenyl)propane.

Trimethacrylate compound

Trimethylolpropane trimethacrylate and trimethylolethane trimethacrylate.

Among the above compounds, divinylbenzene, ethylene glycol dimethacrylate and trimethylolpropane trimethacrylate are particularly preferred. Divinylbenzene is more preferable. These crosslinking polyvinyl monomers may be used alone or in combination of two or more.

In the process of this invention, the proportion of the weight of the non-hydrophilic, crosslinking polyvinyl monomers to the weight of the whole monomers to be polymerized is at least 20% by weight, preferably at least 25% by weight, more preferably at least 30% by weight. The "proportion of the non-hydrophilic, crosslinking polyvinyl monomers" used herein is based on the weight of pure monomers freed of diluents and other impurities.

The polymerizable monomer mixture may preferably be composed of only the non-hydrophilic, crosslinking polyvinyl monomer or monomers. However, monovinyl monomers may be used with the non-hydrophilic, crosslinking polyvinyl monomers in this invention and include aromatic monovinyl compounds such as styrene, ethyl vinyl benzene (main inpurity in commercially available divinylbenzene), α-methylstyrene, fluorostyrene, vinylpyridine and the like; acrylic ester monomers such as butyl acrylate, 2-ethylhexyl acrylate, glycidyl acrylate, N,N'-dimethylaminoethyl acrylate and the like; methacrylic ester monomers such as butyl methacrylate, 2-ethylhexyl methacrylate, methyl methacrylate, 2-hydroxyethyl methacrylate, glycidyl methacrylate, N,N'-dimethylaminoethyl methacrylate and the like; mono- and di-carboxylic unsaturated acids such as acrylic acid, methacrylic acid, maleic acid, itaconic acid and the like; anhydrides of the dicarboxylic unsaturated acids; unsaturated amide monomers such as acrylamide, methacrylamide and the like; etc. Conjugated diene compounds such as butadiene, isoprene and the like; vinyl esters of aliphatic acids such as vinyl acetate and the like; and other α-olefinic compounds such as 4-methylpentane and the like may also be used to such an extent that the polymerization rate and polymerization stability are adversely affected thereby. Among them, styrene and ethyl vinyl benzene are particularly preferable. The above polymerizable monovinyl monomers may be used alone or in combination of two or more.

The non-reactive solvent used in the process of this invention may be any solvent which can be absorbed by the seed polymer and which is inert to the radical polymerization and does not impair the polymerization of monomers. The solvent includes, for example, hydrocarbon compounds such as benzene, toluene, xylene, hexane, heptane, cyclohexane and the like; alcohols such as cyclohexanol, octanol and the like; esters such as dibutyl phthalate, dioctyl phthalate and the like; and ketones such as cyclohexanone and the like.

In general, when a non-reactive solvent having a high affinity to the polymer obtained is used, porous polymer particles having a very small pore diameter are obtained, and when a non-reactive solvent having a low affinity to the polymer obtained is used, porous polymer particles having a large pore diameter are obtained.

For example, when the polymer obtained is of divinylbenzene, the use of toluene which has a good affinity to the polymer as the non-reactive solvent enables the formation of porous particles having an average pore diameter of 50–100 Å, and the use of cyclohexanol which has a low affinity to the polymer results in the formation of porous particles having an average pore diameter as large as 500–2,000 Å.

The non-reactive solvents may be used alone or in combination of two or more, and the affinity of the non-reactive solvent to the polymer obtained can be appropriately controlled by use of a combination of two or more solvents.

The proportion of the non-reactive solvent used is not more than 1 part by weight per part by weight of the polymerizable monomer mixture. When it is less than 0.1 part by weight, the resulting crosslinked polymer particles are substantially non-porous. When it is intended to produce porous, crosslinked polymer particles, the proportion of the non-reactive solvent is 0.1 to 1 part by weight, preferably 0.2 to 1 part by weight, more preferably 0.3 to 1 part by weight, per part by weight of the polymerizable monomer mixture. By adjusting the proportion of the non-reactive solvent, the void content of the porous particle can be controlled. When the proportion of the non-reactive solvent is more than 1 part by weight per part by weight of the copolymerizable monomer mixture, it becomes difficult to maintain the form of porous particles.

The non-reactive solvent includes the solvents and inert components which are contained as diluents or impurities in some of the non-hydrophilic, crosslinking polyvinyl monomers.

In the process of this invention, the polymerizable monomer mixture and the non-reactive solvent may be added at one time to the aqueous seed polymer particle dispersion at the beginning of the polymerization or may be added in portions or continuously while effecting the polymerization. In this invention, it is necessary to allow the whole of the polymerizable monomer mixture to be absorbed by the seed polymer particles before substantial crosslinkage is formed by polymerization in the seed polymer particles.

When the polymerizable monomer mixture is added after the middle of the polymerization, the monomer mixture is not absorbed by the seed polymer, whereby fine particles are formed in a large amount in the polymerization system and the stability of polymerization system becomes inferior, which makes the maintenance of polymerization impossible. Therefore, it is preferable to add the whole of the polymerizable monomer mixture to the aqueous seed polymer particle dispersion before the start of the polymerization or before the polymerization conversion reaches about 30%. In this invention, it is most preferable to add the whole of the polymerizable monomer mixture and the whole of the non-reactive solvent to the aqueous seed polymer particle dispersion before the start of the polymerization, stirring the dispersion to allow the seed polymer particles to absorb the two, and then initiating the polymerization.

In this invention, the proportion of the polymerizable monomer mixture plus the non-reactive solvent to the non-crosslinked low molecular weight polymer (seed polymer) is 4 to 20 parts by weight, preferably 5 to 16 parts by weight, more preferably 6 to 12 parts by weight, of the former per part by weight of the latter. When the proportion is less than 4 parts by weight, the crosslinked polymer particles obtained are inferior in hardness and thermal resistance and when the proportion is more than 20 parts by weight, the absorption of the polymerizable monomer mixture in the seed polymer becomes incomplete and a considerable amount of the polymerizable monomer mixture remains unabsorbed and emulsion-polymerizes independently to deteriorate the stability of polymerization system greatly.

In the process of this invention, it is possible to control the particle diameters of the finally obtained crosslinked polymer particles by controlling the amounts of the polymerizable monomer mixture and the non-crosslinked low molecular weight polymer particles (seed polymer particles). Specifically, assuming that the weight of the seed polymer particles be Ws, the number average particle diameter of the seed polymer particles be Ds, the amount of the polymerizable monomer mixture be M and the amount of the non-reactive solvent be S, the number average particle diameter D of the crosslinked polymer particles can be inferred from the following equation and the calculated value is very near to the actually obtained value:

$$D \approx \sqrt[3]{\frac{M + S + W_s}{W_s}} \times DS$$

In the process of this invention, as a polymerization initiator, there may be used conventional water-soluble radical polymerization initiators and oil-soluble radical polymerization initiators.

The oil-soluble radical polymerization initiators include benzoyl peroxide, $\alpha,\alpha'$-azobisisobutyronitrile, t-butylperoxy-2-ethyl hexanonate, 3,5,5-trimethylhexanoyl peroxide and the like.

The water-soluble radical polymerization initiator includes, for example, potassium persulfate, sodium persulfate, cumene hydroperoxide, hydrogen peroxide, and redox initiators consisting of combinations of these reducing agents.

The water-soluble radical polymerization initiators are preferred because when they are used the monomers unabsorbed by the seed polymer are hardly polymerized in the aqueous phase. In addition, $\alpha,\alpha$-azobisisobutyronitrile is also preferably used though it is oil-soluble.

In the polymerization reaction, the addition of a small amount of a water-soluble polymerization inhibitor such as potassium bichromate, ferric chloride, hydroquinone or the like is preferred because the formation of finely divided particles can be prevented thereby. Moreover, a suspending agent or a surfactant may be used to enhance the stability of the polymerization system. However, in some cases, the addition of a surfactant results in the formation of finely divided particles which deteriorate the stability of polymerization system. Therefore, the amount of the surfactant added should be as small as possible. In particular, when the polymerization is initiated with a water-soluble radical polymerization initiator, the concentration of the surfactant must be not higher than the critical micelle concentration (C.M.C.).

On the other hand, when the polymerization is effected with the oil-soluble radical polymerization initiator, the polymerization can be conducted at a higher concentration of the surfactant than the C.M.C. if the water-solubilities of the monomers and the oil-soluble radical polymerization initiator are sufficiently low.

In this invention, the surfactant may be any conventional one and includes, for example, anionic surfactants such as sodium dodecylbenzenesulfonate, sodium laurylsulfate, sodium dialkylsulfosuccinate, a formaldehyde condensate of naphthalenesulfonic acid and the like. Further, nonionic surfactants such as polyoxyethylenenonyl phenyl ether, polyethylene glycol monostearate, sorbitane monostearate and the like can also be used in combination with the anionic surfactants.

Preferred suspending agents which may be used in this invention include polyvinyl alcohol, carboxymethylcellulose, poly(sodium acrylate), finely divided inorganic compounds and the like.

In the process of this invention, the most preferable combination of the radical polymerization initiator with the stabilizer for producing porous highly crosslinked polymer particles having the desired average particle diameters and the desired narrow particle diameter distribution with good reproducibility is that of a water-soluble radical polymerization initiator as the radical polymerization initiator with a surfactant at its concentration in the polymerization system not higher than and near the C.M.C. (specifically 0.3–1.0 time the C.M.C.) as the stabilizer.

The polymer particles obtained just after the polymerization in the presence of the non-reactive solvent contain the solvent in the interior of the particles, and the solvent can be removed by subjecting the particles to steam stripping, treatment under reduced pressure, drying, extraction or the like.

The porous or non-porous, highly crosslinked polymer particles of this invention have very high hardness, strength, thermal resistance and solvent resistance and also have well controlled, very small particle diameters. Therefore, they can be used in various fields utilizing the above characteristic features.

Uses of the highly crosslinked polymer particles of this invention include improvers for surface sliding property of plastic film, spacers, blocking inhibitors, powder-fluidity-improvers, powder lubricants, particles for cosmetics, abrasives, rubber-compounding agents, plastic pigments, fillers, filtering adjuvants, gelling agents, flocculants, additives for paints, gloss-adjusting agents, mold releasing agents, chromatographic column fillers, particles for microcapsules, additives for synthetic fibers, slowly releasable carriers, powder-swelling agents, film additives, resin additives and the like.

Moreover, the highly crosslinked polymer particles of this invention are particularly effective as adjuvants for toners of electronograph. For example, when 1 to 10% by weight of the highly crosslinked polymer particles of this invention are added together with the base resin and various toner additives in the production of a toner and the resulting mixture is melted and then crushed, the crushability is improved and hence the energy required therefor is reduced. Also, the crushed product has a narrow particle diameter distribution and classification of the product becomes easier. In addition, it is possible to enhance the balance between toner-fixing and blocking resistance. Furthermore, when 0.05 to 5% by weight of the highly crosslinked polymer particles of this invention are dry blended with the toner, it is possible to enhance the blocking resistance and fluidity of toner, reduce the amount of toner adhereing to a photosensitive drum and also improve the background of copy, prevent the toner from being deteriorated with time and prevent the image density from being reduced.

This invention is further explained in more detail below referring to Examples. However, the Examples are merely by way of illustration and not by way of limitation.

EXAMPLE 1

| | |
|---|---|
| Styrene | 98 parts by weight |
| Methacrylic acid | 2 parts by weight |
| t-Dedecylmercaptan | 10 parts by weight |
| Sodium dodecylbenzenesulfonate | 0.8 parts by weight |
| Potassium persulfate | 0.4 parts by weight |
| Water | 200 parts by weight |

The above materials were placed in a 2-liter flask and the temperature of the contents of the flask was elevated to 70° C. in a nitrogen atmosphere while stirring the contents, at which temperature the resulting mixture was subjected to polymerization for 6 hours, to obtain polymer particles having an average particle diameter of 0.17 μm and a standard deviation of particle diameter of 0.08 μm (referred to hereinafter as Seed Polymer Particles A). The average particle diameter was an average of the diameters obtained by measuring 100 polymer particles by means of an electron microscope (this applies hereinafter). The Seed Polymer Particles A had a toluene-soluble content of 98% by weight and the following molecular weights as measured by a gel permeation chromatography:

weight average molecular weight (Mw)=5,000 and number average molecular weight (Mn)=3,100.

Subsequently, the following materials were stirred at 30° C. for 10 minutes to allow the seed polymer particles to absorb the monomers, but some amount of the monomers remained unabsorbed:

| | |
|---|---|
| Seed Polymer Particles A (as solids) | 8 parts by weight |
| Sodium laurylsulfate | 1.0 parts by weight |
| Potassium persulfate | 0.5 parts by weight |
| Water | 500 parts by weight |
| Divinylbenzene (Commercially available product of 55% purity, balance: monovinyl monomers) | 100 parts by weight |

Subsequently, the temperature of the mixture was elevated to 70° C. and the mixture was subjected to polymerization at said temperature for 3 hours, to obtain crosslinked polymer particles with a high stability of polymerization system at a polymerization conversion of 99%. At the middle of the polymerization, some amount of the monomers floated at the upper level of the polymerization mixture. But the polymerization stability was fairly good. The amount of the polymerization coagulum remaining on a 200-mesh filter was 0.02% by weight (based on the weight of the polymerization solids content in the resulting latex).

The crosslinked polymer particles had, as subjected to an electron microscope, an average particle diameter of 0.38 μm and such a narrow particle diameter distribution that the proportion of the weight of particles having particle diameters falling within the range of the average particle diameter ±10% to the weight of the whole particles was 91% and were spherical.

The crosslinked polymer particles were subjected to differential thermal analysis and thermobalance analysis to find that they did not melt nor soften from room temperature to 450° C. and the temperature at which the weight of the particles reduced by 10% when the temperature of the particles on the thermobalance was elevated at a rate of 10° C./min in a nitrogen atmosphere ($T_{10}$) was 415° C. Also, when 10 g of the polymer particles were heated at 300° C. for 5 hours in a nitrogen atmosphere, the weight of then reduced by 8%.

EXAMPLE 2

The same procedure as in Example 1 was repeated, except that 20 parts by weight of divinylbenzene (as pure product) and 80 parts by weight of styrene were substituted for the 100 parts by weight of divinylbenzene, to obtain polymer particles having an average particle diameter of 0.39 μm, such a particle diameter distribution that the proportion of the weight of particles having diameters falling within the range of the average particle diameter ±10% to the weight of the whole particles was 89% and a $T_{10}$ value of 395° C. When the particles were heated at 300° C. for 5 hours in a nitrogen atmosphere the weight of them reduced by 21%.

EXAMPLES 3 TO 5 AND COMPARATIVE EXAMPLES 1 TO 3

The same procedure as in Example 1 was repeated, except that the amount of t-dodecylmercaptan was changed to 0 part by weight, 2 parts by weight, 5 parts by weight, 20 parts by weight, 50 parts by weight or 100 parts by weight, to obtain six kinds of polymer particles having weight average molecular weights of 120,000, 15,000, 8,900, 3,050, 710 and 320, respectively (referred to hereinafter as Seed Polymer Particles B to G, respectively).

The same procedure as in Example 1 was repeated, except that each of the Seed Polymer Particles B to G was substituted for the Seed Polymer Particles A, to produce six kinds of crosslinked polymer particles.

The proportions of polymerization coagulums foamed in the polymerization reactions, the polymerization conversions, the average particle diameters of the crosslinked polymer particles obtained and the proportion of the weight of particles having particle diameters falling within the range of the average particle diameter ±10% to the weight of the whole particles formed (weight fraction of particles having particle diameters falling within the range of average particle diameter ±10%) are shown in Table 1.

As is clear from Table 1, in Comparative Examples 1 and 3, the reaction system gelled during the polymerization and in Comparative Example 2, the amount of the polymerization coagulum was too large though polymerization was achieved and the polymer particles obtained were a mixture of three kinds of particles, one kind of which were particles having an average particle diameter of 0.4 μm which is near the desired average particle diameter, another kind of which were fine particles having particle diameters ranging from 0.05 μm to 0.1 μm in a large amount and the other kind of which were particles having particle diameters ranging from 10 μm to 100 μm formed by polymeriztaion of droplets of monomers which had not been absorbed by the seed polymer particles.

COMPARATIVE EXAMPLE 4

The same procedure as in Example 1 was repeated, except that 90 parts by weight of styrene and 10 parts by weight of divinylbenzene (as pure product) were substituted for the 100 parts by weight of divinylbenzene, to obtain crosslinked polymer particles as shown in Table 1.

weight, to obtain two kinds of polymer particles having different particle diameters (hereinafter referred to as Seed Polymer Particles I and H, respectively). The Seed Polymer Particles I had an average particle diameter of 0.08 μm and the Seed Polymer Particles H had an average particle diameter of 0.45 μm.

Using the Seed Polymer Particles I and H, the same procedure as in Example 1 was repeated, except that the amount of the seed polymer particles was changed to 12 parts by weight, to obtain two kinds of crosslinked polymer particles as shown in Table 1.

TABLE 1

| | Seed polymer particle | | | Polymn. coagulum content (wt %) | Polymn. conversion (%) | Crosslinked polymer particle | | | |
|---|---|---|---|---|---|---|---|---|---|
| | Type | Mw | Average diameter (μm) | | | Average diameter (μm) | Diameter distribution* (%) | $T_{10}$ | Weight reduction** (wt %) |
| Comp. Ex. | | | | | | | | | |
| 1 | B | 120000 | 0.18 | (gelled) | — | — | — | — | — |
| 2 | C | 15000 | 0.15 | 15 | 98 | 2.5 | 12 | 391 | 27 |
| 3 | G | 320 | 0.22 | (gelled) | — | — | — | — | — |
| Example | | | | | | | | | |
| 1 | A | 5000 | 0.17 | 0.02 | 97 | 0.38 | 91 | 415 | 8 |
| 2 | A | 5000 | 0.17 | 0.02 | 97 | 0.39 | 89 | 395 | 21 |
| 3 | D | 8900 | 0.15 | 0.05 | 99 | 0.33 | 90 | 397 | 19 |
| 4 | E | 3050 | 0.12 | 0.02 | 98 | 0.26 | 83 | 395 | 25 |
| 5 | F | 710 | 0.15 | 0.78 | 98 | 0.33 | 85 | 397 | 24 |
| 6 | A | 5000 | 0.17 | 0.02 | 97 | 0.38 | 87 | 405 | 12 |
| 7 | A | 5000 | 0.17 | 0.02 | 98 | 0.39 | 90 | 395 | 21 |
| Comp. Ex. | | | | | | | | | |
| 4 | A | 5000 | 0.17 | 0.02 | 98 | 0.31 | 85 | 375 | 52 |
| Example | | | | | | | | | |
| 8 | A | 5000 | 0.17 | 2.5 | 98 | 0.38 | 81 | 412 | 9 |
| 9 | I | 5100 | 0.08 | 0.05 | 98 | 0.15 | 91 | 412 | 9 |
| 10 | H | 5800 | 0.45 | 0.12 | 98 | 0.92 | 87 | 415 | 8 |

Note:
*Weight fraction of particles having diameters falling within the range of average particle diameter ±10%.
**Weight reduction of particles heated at 300° C. for 5 hrs.

EXAMPLE 6

The same procedure as in Example 1 was repeated, except that 60 parts by weight of styrene and 40 parts by weight of divinylbenzene (as pure product) were substituted for the 100 parts by weight of divinylbenzene, to obtain crosslinked polymer particles as shown in Table 1.

EXAMPLE 7

The same procedure as in Example 1 was repeated, except that 80 parts by weight of methyl methacrylate and 20 parts by weight of ethylene glycol dimethacrylate were substituted for the 100 parts by weight of divinylbenzene, to obtain crosslinked polymer particles as shown in Table 1.

EXAMPLE 8

The same procedure as in Example 1 was repeated, except that the amount of sodium laurylsulfate was changed to 2.0 parts by weight (the concentration of sodium laurylsulfate in water was 170% of the C.M.C. of the soap in water at 25° C.), to obtain crosslinked polymer particles as shown in Table 1.

In this polymerization, the amount of the soap was too large, so that the stability of polymerization system was impaired and the particle diameter distribution of the particles obtained was slightly inferior.

EXAMPLE 9 AND 10

The same procedure as in Example 1 was repeated, except that the amount of sodium dodecylbenzenesulfonate was changed to 2 parts by weight or 0.05 part by For comparison, polystyrene, polymethyl methacrylate, polyisobutylene, polybutadiene, polyvinyl chloride, polyvinyldiene chloride, polyacrylonitrile, phenol resin (novolak), benzoquanamine resin (novolak) and teflon have the $T_{10}$ values and weight reductions on heating at 300° C. for 5 hours in $N_2$ shown in Table 2.

TABLE 2

| | Shape | $T_{10}$ (°C.) | Weight reduction (wt. %) |
|---|---|---|---|
| Polystyrene | Particle (dia. 10 μm) | 330 | 80 |
| Polymethyl methacrylate | Particle (dia. 0.7 μm) | 280 | 95 |
| Polyisobutylene | Block | 300 | 95 |
| Polybutadiene | Block | 350 | 75 |
| Polyvinyl chloride | Particle (dia. 5 μm) | 250 | 60 |
| Polyvinylidene chloride | Particle (dia. 5 μm) | 410 | 50 |
| Polyacrylonitrile | Particle (dia. 10 μm) | 240 | 60 |
| Phenol resin (novolak) | Block | 250 | 20 |
| Benzoguanamine resin (novolak) | Particle (dia. 10 μm) | 305 | 75 |
| Teflon | Particle (dia. 20 μm) | 450 | 7 |

REFERENCE EXAMPLES 1 TO 10

The Reference Examples show that when a polymerizable monomer mixture containing too much crosslinking monomer is used it is difficult to conduct emulsion polymerization.

A polymerization system consisting of 500 parts by weight of water, 0.5 part by weight of potassium persulfate as an initiator, sodium dodecylbenzenesulfonate as an emulsifier, and a total of 100 parts by weight of styrene, divinylbenzene and acrylic acid as polymerizable monomers was subjected to polymerization at 70° C. for 6 hrs in a nitrogen atmosphere in which the amount of the emulsifier and the proportion of the monomers were as shown in Table 3. The amounts of the coagulum formed in the polymerization and the polymerization conversion were as shown in Table 3.

In Reference Examples 1 to 6, the proportion of styrene to divinylbenzene was changed. When the amount of divinylbenzene exceeds 3 parts by weight, the stability of polymerization system becomes inferior and the amount of coagulum formed becomes excessive or the polymerization system gels. In Reference Examples 7 and 8, the amount of emulsifier was increased using 3 parts by weight of divinylbenzene. In this case, the amount of foreign particles newly formed during the polymerization increases, and the stability of polymerization system becomes inferior thereby. In Reference Examples 9 and 10, it was tried to increase the stability of particles by use of an acid monomer in combination with the polymerizable monomer mixture; however, no great effect was found.

As stated above, when a polymerizable monomer mixture comprising a large proportion of the cross-linking polyvinyl monomer is used, the emulsion polymerization of such a polymerization system is difficult.

TABLE 3

| Reference Example No. | Emulsifier | Monomer components (wt %) Styrene | Divinylbenzene | Acrylic acid | Polymn. coagulum content (wt %) | Polymn. conversion (%) |
|---|---|---|---|---|---|---|
| 1 | 0.5 | 100 | — | — | 0.01 | 98 |
| 2 | 0.5 | 99 | 1 | — | 1.0 | 99 |
| 3 | 0.5 | 97 | 3 | — | 10.2 | 97 |
| 4 | 0.5 | 95 | 5 | — | gelled | — |
| 5 | 0.5 | 90 | 10 | — | gelled | — |
| 6 | 0.5 | 70 | 30 | — | gelled | — |
| 7 | 2 | 97 | 3 | — | gelled | — |
| 8 | 5 | 97 | 3 | — | gelled | — |
| 9 | 0.5 | 95 | 3 | 2 | 8.2 | 96 |
| 10 | 0.5 | 87 | 3 | 10 | 5.3 | 97 |

EXAMPLE 11

| | |
|---|---|
| The Seed Polymer Particles A (as solids) | 10 parts by weight |
| Sodium laurylsulfate | 1.0 parts by weight |
| Potassium persulfate | 0.5 parts by weight |
| Water | 500 parts by weight |
| Commercially available divinylbenzene(purity: 55%, balance: monovinyl monomer) | 50 parts by weight |
| Cyclohexanol | 50 parts by weight |

The above materials were placed in a reactor and stirred at 30° C. for 10 min to allow the monomers and cyclohexanol to be absorbed by the seed polymer particles. But some amount of the mixture of the monomer and the solvent remained unabsorbed. The proportion of sodium laurylsulfate to water was 87% by weight of the C.M.C. of the soap in water at 25° C.

Subsequently, the system was heated to 75° C. and subjected to polymerization at said temperature for 3 hrs, upon which the polymerization conversion became 99% and the amount of the polymerization coagulum remaining on a 200-mesh filter was 0.02% based on the weight of the solids formed by polymerization. As a result, porous polymer particles were obtained with good stability of polymerization system.

To the dispersion of the porous polymer particles obtained (100 g of as solids) was added a 1% by weight aqueous aluminum sulfate solution (1 g as solids), and the resulting mixture was filtered. The residue was well washed with water to remove the cyclohexanol, and thereafter dried under reduced pressure to obtain porous polymer powder.

The porous polymer powder thus obtained was observed by an electron microscope to find that the average particle diameter was 0.37 μm and the standard deviation of particle diameter was 3.5% of the average particle diameter.

Moreover, the surface of the particle was magnified and observed to find that rough pores having diameters of 0.05-0.1 μm were formed throughout the surface. Also, the specific surface area of the particle was as large as 105 m$^2$/g as measured by a B.E.T. device.

Furthermore, the porous polymer particles were subjected to thermobalance analysis at a temperature elevating rate of 10° C./min in a nitrogen atmosphere to find that the temperature at which the weight reduction of the particles started was 415° C. In addition, the porous polymer particles were subjected to measurement of weight reduction upon heating the particles at 300° C. for 5 hrs in a nitrogen atmosphere to find that it was 10% by weight. The weight reduction starting temperature and the weight reduction indicated that the porous polymer particles had particularly high thermal resistance as organic polymer particles.

EXAMPLE 12

The same procedure as in Example 11 was repeated, except that 25 parts by weight of styrene and 25 parts by weight of commercially available divinylbenzene (purity 55%) were substituted for the 50 parts by weight of commercially available divinylbenzene, to prepare porous polymer particles.

The measurement results are shown in Table 4.

COMPARATIVE EXAMPLE 5

The same procedure as in Example 11 was repeated, except that 40 parts by weight of styrene and 10 parts by weight of commercially available divinylbenzene (purity: 55%) were substituted for the 50 parts by weight of commercially available divinylbenzene, to prepare porous polymer particles.

The measurement results obtained are shown in Table 4.

EXAMPLE 13

The same procedure as in Example 11 was repeated, except that 50 parts by weight of ethylene glycol dimethacrylate were substituted for the 50 parts by weight of commercially available divinylbenzene, to prepare porous polymer particles.

The measurement results obtained are shown in Table 4.

EXAMPLE 14

In this Example, polymerization was conducted using an oil-soluble initiator and a suspending agent.

| Seed Polymer Particles H (as solids) | 7 parts by weight |
| --- | --- |
| Polyvinyl alcohol | 10 parts by weight |
| Hydroquinone | 0.05 parts by weight |
| Water | 500 parts by weight |
| α,α'-Azobisisobutyronitrile (used in admixture with monomers) | 1 parts by weight |
| Commercially available divinylbenzene (purity: 55%) | 50 parts by weight |
| Toluene | 50 parts by weight |

The above materials were placed in a reactor and stirred for 30 minutes, after which the temperature of the mixture was elevated to 70° C. and the mixture was then subjected to polymerization at said temperature for 4 hours. The polymerization mixture was then subjected to the same subsequent treatment as in Example 11 to obtain porous, crosslinked polymer particles. The porous, crosslinked polymer particles were subjected to the same measurements as in Example 11 to obtain the results shown in Table 4.

EXAMPLES 15 TO 20 AND COMPARATIVE EXAMPLES 6 AND 7

The same procedure as in Example 11 was repeated, except that the kind and amount of the non-reactive solvent was changed as shown in Table 5, to prepare 6 kinds of porous polymer particles for the Examples and 2 kinds of porous polymer particles for the Comparative Examples.

The measurement results obtained are shown in Table 5, in which the results in Examples 1 and 11 are also shown for comparison.

In Comparative Example 6, the amount of the non-reactive solvent was so high that the polymerization coagulum content was large.

In Comparative Example 7, the amount of the non-reactive solvent was too large to maintain the polymer particle form during the polymerization, so that the particles were crushed and the specific surface areas of the particles were rather reduced.

In Example 18, toluene was used as the non-reactive solvent and the product was good porous polymer particles having so small pore diameters that the pores could not be confirmed even by means of an electron microscope. Therefore, the polymer particles were subjected to a mercury-press-in type porosimeter to determine the pore diameter distribution. It was found that pores having diameters of 20 to 100 Å occupied 80% of the whole.

EXAMPLES 21 AND 22 AND COMPARATIVE EXAMPLES 8 TO 10

The same procedure as in Example 4 was repeated, except that the amount of sodium dodecylbenzenesulfonate was changed to 0.05 part by weight to prepare seed polymer particles having a weight average molecular weight of 3,050 and an average particle diameter of 0.31 μm (hereinafter referred to as Seed Polymer Particles J).

Using the Seed Polymer Particles J in varying amounts, porous, crosslinked polymer particles were prepared as follows:

| Seed Polymer Particles J (as solids) | Amount shown in Table 6 |
| --- | --- |
| Polyvinyl alcohol | 10 parts by weight |
| Hydroquinone | 0.05 parts by weight |
| Water | 500 parts by weight |
| Benzoyl peroxide (used in admixture with monomers) | 1 parts by weight |
| Commercially available divinylbenzene (purity: 55%) | 50 parts by weight |
| Non-reactive solvent (Cyclohexanol) | 50 parts by weight |

The above materials were placed in a reactor and stirred for 30 minutes, after which the temperature of the mixture was elevated to 70° C. and the mixture was then subjected to polymerization at said temperature for 4 hours. The polymerization mixture was then subjected to the same subsequent treatment as in Example 11 to obtain 2 kinds of porous, crosslinked polymer particles for the Examples and 3 kinds of porous, crosslinked polymer particles for the Comparative Examples.

The porous, crosslinked polymer particles were subjected to the same measurements as in Example 11 to obtain the results shown in Table 6.

In Comparative Examples 8 and 9, the proportion of the total amount of the polymerizable monomers and the non-reactive solvent to the amount of the seed polymer particles was excessive, so that a large amount of polymer particles were newly formed by polymerization of the monomers which had not been absorbed by the seed polymer particles in the two Comparative Examples, and the particle diameter distributions in the two were broad. In Comparative Example 9, the stability of polymerization system was also deteriorated. In Comparative Example 10, the amount of the seed polymer particles was too large to obtain porous, crosslinked polymer particles having excellent thermal resistance.

TABLE 4

| | Seed polymer particle | | | Polymn. coagulum content (wt. %) | Polymn. conversion (%) | Porous polymer particle | | | | |
| --- | --- | --- | --- | --- | --- | --- | --- | --- | --- | --- |
| | Type | Mw | Average diameter (μm) | | | Average diameter (μm) | Diameter distribution* (wt. %) | Specific surface area (m²/g) | $T_{10}$ (°C.) | Weight reduction** (wt. %) |
| Ex. 11 | A | 5000 | 0.17 | 0.02 | 99 | 0.37 | 92 | 105 | 415 | 10 |
| Ex. 12 | A | 5000 | 0.17 | 0.07 | 98 | 0.36 | 88 | 89 | 390 | 17 |
| Comp. Ex. 5 | A | 5000 | 0.17 | 0.05 | 98 | 0.35 | 89 | 90 | 370 | 52 |
| Ex. 13 | A | 5000 | 0.17 | 0.02 | 98 | 0.36 | 89 | 51 | 390 | 19 |
| Ex. 14 | H | 5800 | 0.45 | 0.12 | 98 | 0.94 | 92 | 110 | 415 | 10 |

Note:
*The same as in Table 1.
**The same as in Table 1.

TABLE 5

| | Non-reactive solvent | | Polymn. coagulum content (wt. %) | Polymn. conversion (%) | Porous polymer particle | | | | |
|---|---|---|---|---|---|---|---|---|---|
| | Kind | Amount (part) | | | Average diameter (μm) | Diameter distribution* (μm) | Specific surface area (m²/g) | $T_{10}$ (°C.) | Weight reduction** (wt. %) |
| Ex. 1 | None | — | 0.02 | 98 | 0.38 | 91 | 5 | 415 | 8 |
| Ex. 15 | Cyclohexanol | 5 | 0.01 | 99 | 0.32 | 92 | 50 | 405 | 12 |
| Ex. 16 | " | 20 | 0.02 | 97 | 0.34 | 87 | 75 | 403 | 10 |
| Ex. 11 | " | 50 | 0.02 | 99 | 0.37 | 92 | 105 | 415 | 10 |
| Ex. 17 | " | 100 | 0.30 | 98 | 0.43 | 85 | 121 | 415 | 12 |
| Comp. Ex. 6 | " | 200 | 3.5 | 97 | 0.50 | 82 | 130 | 410 | 7 |
| Comp. Ex. 7 | " | 400 | 12 | 96 | (1.0–0.5 μm, crushed) | | 10 | 400 | 10 |
| Ex. 18 | Toluene | 50 | 0.01 | 98 | 0.35 | 90 | 151 | 410 | 12 |
| Ex. 19 | Hexane | 50 | 1.2 | 98 | 0.37 | 90 | 120 | 415 | 11 |
| Ex. 20 | Dioctyl phthalate | 20 | 1.2 | 98 | 0.33 | 92 | 70 | 412 | 11 |

Note:
*The same as in Table 1.
**The same as in Table 1.

TABLE 6

| | Amount of seed polymer particle (part) | Total of monomer + solvent (part) | Monomer + solvent/seed polymer particle | Polymn. coagulum content (wt. %) | Polymn. conversion (%) | Porous polymer particle | | | | |
|---|---|---|---|---|---|---|---|---|---|---|
| | | | | | | Average diameter (μm) | Diameter distribution* (μm) | Specific surface area (m²/g) | $T_{10}$ (°C.) | Weight reduction** (wt. %) |
| Ex. 21 | 7 | 100 | 14.3 | 0.12 | 98 | 0.76 | 92 | 112 | 405 | 12 |
| Comp. Ex. 10 | 30 | 100 | 3.3 | 0.10 | 96 | 0.56 | 86 | 112 | 360 | 40 |
| Ex. 22 | 10 | 100 | 10 | 0.05 | 98 | 0.67 | 90 | 101 | 415 | 8 |
| Comp. Ex. 8 | 4 | 100 | 25 | 7.0 | 98 | 0.83 | 81 | 52 | 415 | 5 |
| Comp. Ex. 9 | 1 | 100 | 100 | 14.2 | 97 | 0.98 | 72 | 31 | 420 | 3 |

Note:
*The same as in Table 1.
**The same as in Table 1.

What is claimed is:

1. Highly crosslinked polymer particles consisting essentially of a non-hydrophilic polymer of a polymerizable monomer mixture comprising at least 20% by weight of at least one non-hydrophilic, crosslinking polyvinyl monomer and satisfying the following conditions (a) to (e):
   (a) the average particle diameter ($r_m$) is 0.1–1.0 μm and the proportion of particles having particle diameters falling within the range of $9.0 r_m$ to $1.1 r_m$ to the whole of particles is 80% by weight,
   (b) the polymer particles are substantially insoluble in toluene and substantially nonswellable with toluene,
   (c) when the polymer particles are heated on a thermobalance in a nitrogen atmosphere while elevating the temperature at a range of 10° C./min., the temperature at which the weight of the particles reduces by 10% is at least 380° C.,
   (d) when the polymer particles are heated at 300° C. for 5 hours in a nitrogen atmosphere, the weight reduction is at most 30%, and
   (e) the polymer particles ar not melt-adhered to one another at 200° C. in a nitrogen atmosphere; with the following provisos:
   (1) monomers are added to an aqueous dispersion containing non-crosslinked, low molecular weight polymer particles having a weight average molecular weight of 500–10,000 as dispersoid,
   (2) the monomer mixture comprises at least 20% by weight of at least one non-hydrophilic, crosslinking polyvinyl monomer,
   (3) the proportion of the polymerizable monomer to the low molecular weight polymer particles is 4 to 20 parts by weight and
   (4) the polymerizable monomer mixture is subjected to radial emulsion polymerization with stirring.

2. The highly crosslinked porous polymer particles according to claim 1, wherein the polymerizable monomer mixture is added together with a non-reactive solvent in a proportion of 0.1 to 1 part by weight of the polymerizable monomer mixture.

3. The highly crosslinked polymer particles according to claim 1 or 2 wherein the at least one non-hydrophilic, cross-linking polyvinyl monomer is selected from non-conjugated divinyl compounds and polyacrylate compounds.

4. The highly crosslinked polymer particles according to claim 3, wherein the polyacrylate compounds include diacrylate compounds, triacrylate compounds, tetraacrylate compounds, dimethacrylate compounds and trimethacrylate compounds.

5. The highly crosslinked polymer particles according to claim 1 or 2, wherein the at least one non-hydrophilic, crosslinking polyvinyl monomer is selected from divinylbenzene, ethylene glycol dimethacrylate and trimethylolpropane trimethacrylate.

6. The highly crosslinked polymer particles according to claim 1 or 2, wherein the polymerizable monomer mixture comprises at least one monovinyl monomer selected from the group consisting of aromatic monovinyl compounds, acrylic ester monomers, methacrylic ester monomers, mono- and di-carboxylic unsaturated acid monomers, anhydrides of the dicarboxylic unsaturated acids and unsaturated amide monomers.

7. A process for producing the highly crosslinked polymer particles of claim 1 or 2, which comprises adding, to an aqueous dispersion containing non-crosslinked, low molecular weight polymer particles having a weight average molecular weight of 500–10,000 as a dispersoid, a polymerizable monomer mixture comprising at least 20% by weight of at least one non-hydrophilic, crosslinking polyvinyl monomer with a non-reactive solvent in a proportion of not more than 1 part by weight per part by weight of the polymerizable monomer mixture, the proportion of the polymerizable monomer mixture plus the non-reactive solvent to the low molecular weight polymer particles being 4 to 20 parts by weight per part by weight of the non-crosslinked, low molecular weight polymer, and then subjecting the polymerizable monomer mixture to radical emulsion polymerization with stirring.

8. The process according to claim 7, wherein the polymerizable monomer mixture is added together with a non-reactive solvent in a proportion of 0.1 to 1 part by weight per part by weight of the polymerizable monomer mixture to prepare porous crosslinked polymer particles.

9. The process according to claim 7, wherein the polymerization is effected in the presence of a surfactant at a concentration lower than the critical micelle concentration.

10. The process according to claim 7, wherein the polymerization is effected with a water-soluble polymerization initiator.

11. The process according to claim 9, wherein the polymerization is effected with a water-soluble polymerization initiator.

12. The process according to claim 8, wherein the polymerization is effected in the presence of a surfactant at a concentration lower than the critical micelle concentration.

13. The process according to claim 8, wherein the polymerization is effected with a water-soluble polymerization initiator.

14. The process according to claim 12, wherein the polymerization is effected with a water-soluble polymerization initiator.

15. The process according to claim 7, wherein the non-hydrophilic, crosslinking polyvinyl monomer is divinylbenzene.

16. The process according to claim 8, wherein the non-hydrophilic, crosslinking polyvinyl monomer is divinylbenzene.

17. The process according to claim 8, wherein the polymerization is effected in the presence of a surfactant at a concentration lower than the critical micelle concentration.

18. The process according to claim 8, wherein the polymerization is effected with a water-soluble polymerization initiator.

19. The process according to claim 9, wherein the polymerization is effected with a water-soluble polymerization initiator.

* * * * *